United States Patent
Chang et al.

(10) Patent No.: US 8,692,782 B2
(45) Date of Patent: Apr. 8, 2014

(54) TOUCH DISPLAY APPARATUS AND ELECTRONIC READING APPARATUS WITH TOUCH INPUT FUNCTION

(75) Inventors: Yung-Sheng Chang, Hsinchu (TW); Kai-Cheng Chuang, Hsinchu (TW); Tzu-Ming Wang, Hsinchu (TW); Po-Wen Hsiao, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 720 days.

(21) Appl. No.: 12/819,638

(22) Filed: Jun. 21, 2010

(65) Prior Publication Data
US 2011/0279385 A1    Nov. 17, 2011

(30) Foreign Application Priority Data
May 17, 2010  (TW) ............................... 99115681 A

(51) Int. Cl.
*G06F 3/041* (2006.01)
(52) U.S. Cl.
USPC ............................ 345/173; 345/174; 345/610
(58) Field of Classification Search
USPC ........ 345/173, 174, 610; 340/407.2; 313/485; 341/20; 349/160
See application file for complete search history.

(56) References Cited

U.S. PATENT DOCUMENTS

| | | | | |
|---|---|---|---|---|
| 3,900,758 A | * | 8/1975 | Andoh et al. | 313/485 |
| 6,501,529 B1 | * | 12/2002 | Kurihara et al. | 349/160 |
| 6,593,916 B1 | * | 7/2003 | Aroyan | 345/173 |
| 7,148,881 B2 | * | 12/2006 | Lee et al. | 345/173 |
| 2008/0048989 A1 | * | 2/2008 | Yoon et al. | 345/173 |
| 2009/0262023 A1 | * | 10/2009 | Ying et al. | 343/700 MS |
| 2009/0262083 A1 | | 10/2009 | Parekh | |
| 2010/0141411 A1 | * | 6/2010 | Ahn et al. | 340/407.2 |
| 2010/0148993 A1 | * | 6/2010 | Lee | 341/20 |
| 2010/0156841 A1 | * | 6/2010 | Wang et al. | 345/174 |
| 2010/0265207 A1 | * | 10/2010 | Chen | 345/174 |
| 2011/0134053 A1 | * | 6/2011 | Kao et al. | 345/173 |
| 2012/0313893 A1 | * | 12/2012 | Geaghan | 345/174 |

FOREIGN PATENT DOCUMENTS

| | | |
|---|---|---|
| CN | 101493736 A | 7/2009 |
| TW | 200904115 A | 1/2009 |

OTHER PUBLICATIONS

Communication from the Chinese Patent Office regarding a counterpart foreign application dated Oct. 31, 2012.

\* cited by examiner

*Primary Examiner* — Thuy Pardo
(74) *Attorney, Agent, or Firm* — Jianq Chyun IP Office

(57) ABSTRACT

The present invention relates to a touch display apparatus, which is including a display unit and a touch unit installed under the display unit. The display unit includes a first substrate and a second substrate installed in parallel. The touch unit includes a third substrate installed under the second substrate in parallel, and a plurality of first electrodes and a plurality of second electrodes separately installed on the lower surface of the second substrate and on the upper surface of the third substrate and facing each other. When a user touches the display unit of the electronic reading apparatus, the display unit will have a local deformation accordingly, the first electrode and the second electrode touch each other, and thus a touch signal is generated. Therefore, a touch function can be achieved.

10 Claims, 4 Drawing Sheets

TOUCH DISPLAY APPARATUS AND ELECTRONIC READING APPARATUS WITH TOUCH INPUT FUNCTION

BACKGROUND OF THE INVENTION

1. Field of the Invention

The present invention is a display apparatus featured with touch input function.

2. Description of Related Art

People's need of electronic products gradually increases with the technology development. Portable electronic devices are widely employed in modern life like laptops, PDA, POS, mobile phones, digital cameras and electronic reading apparatus. Moreover, numerous electronic devices are now having the electronic paper technology on the display panel for energy saving and outdoor usage.

The primary features of the electronic paper are reelablility, high-impact, light weight and competitive cost in manufacture. Additionally, the electronic paper does not illuminate its pixel and does not use the backlight to support the brightness. It actually reflects ambient light to display text and images so that it can provide reader a visual perception which is close to printed paper quality. Text and images on the electronic paper can be clearly viewed at outdoor under the extreme strong sunlight. In addition, the electronic paper technology not only decreases the electricity consumption of electronic reading devices, but also extends the battery's life.

Furthermore, with the improvement of user interface design, interaction of human and machine advances in a trend of higher precision and greater convenience. People intuitively use the machine so that they can rapidly understand the function of it. The touch panel technology with user-friendly interface also provides users an easier and more convenient approach to input and manipulate the electronic device in various applications and environments.

FIG. 1 shows a structural cross-section view of a conventional electronic reading apparatus with touch input function.

As shown in FIG. 1, the conventional electronic reading apparatus with touch input function 1 comprises a display unit 10 and a touch unit 14. Also, the touch unit 14 is typically installed over the display unit 10 which allows users to easily input a touch signal.

The display unit 10 which has a first substrate 11 paralleling a second substrate 12, is essentially fabricated with the electronic paper technology. A display dielectric layer 13 sandwiched between the first substrate 11 and the second substrate 12. The display dielectric layer 13 is made of the E-ink. The touch unit 14 can be formed by a touch panel with various touch technologies such as resistive touch panel, capacitive touch panel, optical touch panel or surface acoustic wave touch panel.

In the conventional electronic reading apparatus 1, since the display unit 10 is fabricated with the electronic paper technology, the electronic paper displays text and images by reflecting ambient light instead of illuminating its pixel and using the backlight to support the brightness. Consequently, if the touch unit 14 is installed over the display unit 10, the incident light from the external light source will be blocked due to the minor transparency of the touch unit 14. Therefore, it degrades both of the image clarity and the display brightness of the touch display apparatus 1, while users are using touch display apparatus 1.

SUMMARY OF THE INVENTION

This invention is providing a touch display apparatus and an electronic reading apparatus with touch function. The touch unit of the touch display apparatus is located under the display unit. This will enable the electronic reading apparatus to have the touch function and avoid the display brightness degrade of the display unit from the effect of minor transparency of the touch unit.

The present invention provides a touch display apparatus and an electronic reading apparatus with touch input function which can create a local deformation of the display unit and generate a touch signal by the touch unit located under the display unit, while users touch the display unit of the touch display apparatus via the reelable display unit.

An embodiment of the present invention provides a touch display apparatus comprising a display unit and a touch unit. The display unit has a first substrate paralleling a second substrate and a dielectric display layer sandwiched between the first substrate and the second substrate. The touch unit is located under the display unit with a third substrate, a plurality of first electrodes and a plurality of second electrodes. The third substrate is paralleling the second substrate and there is a gap with fixed distance retained relatively to the second substrate. The plurality of first electrodes are installed on the lower surface of the second substrate and the plurality of second electrodes are installed on the upper surface of the third substrate. Each of the first electrodes has each corresponding second electrode.

An embodiment of the present invention provides an electronic reading apparatus comprising a display unit, a touch unit and a touch controller. The display unit has a first substrate paralleling a second substrate and a display dielectric layer sandwiched between the first substrate and the second substrate. The touch unit located under the display unit generates a touch signal while the display unit sensors a slide move created by an object. The touch unit has a third substrate, a plurality of first electrodes and a plurality of second electrodes. The third substrate is paralleling the second substrate and there is a gap with fixed distance retained relatively to the second substrate. The plurality of first electrodes is located on the lower surface of the second substrate. The plurality of second electrodes is located on the upper surface of the third substrate and has their corresponding second electrodes. The touch signal is generated due to the contact in a pair of electrodes after the touch unit sensors a move on it. The touch controller controls the text and images displaying on display unit with corresponding command generated by the received touch signal.

The aforementioned summary, the following detailed description and the appended drawing are all for further illustrating approaches, means and effects taken by the present invention for successfully achieve the prescribed objectives. Other purposes and advantages of the present invention will be also elucidated in the following sections and diagrams.

DETAILED DESCRIPTION OF THE PREFERRED EMBODIMENTS

Figure 2:
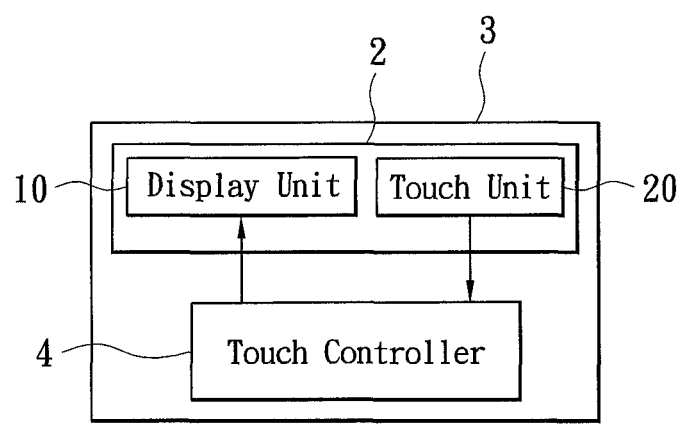
FIG. 2 shows a block diagram of an electronic reading apparatus with touch input function according to a first embodiment of the present invention.

Refer to FIG. 2, wherein a block diagram of an electronic reading apparatus with touch input function according to a first embodiment of the present invention is shown. The electronic reading apparatus 3 comprises a touch display apparatus 2 and a touch controller 4, in which the touch display apparatus 2 further consists of a display unit 10 and a touch unit 20. The detailed structure of the touch display apparatus 2 will be further explained in the following paragraphs.

The electronic reading apparatus 3 presents display contents through the display unit 10 of the touch display apparatus 2 and receives the touch input upon the surface of the display unit 10 via the touch unit 20, and the touch controller 4 performs subsequent input controls based on such a touch input; for example, controls over the display operations of the display unit 10.

Figure 3:
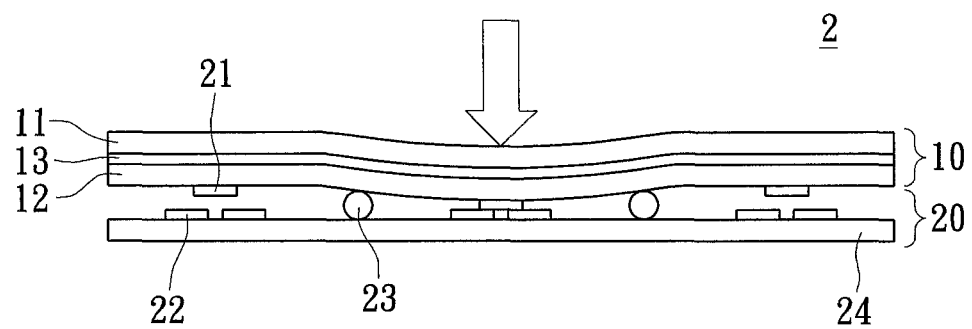
FIG. 3 shows a structural cross-section view of a touch display apparatus according to the first embodiment of the present invention.

FIG. 3 shows a structural cross-section view of a touch display apparatus according to the first embodiment of the present invention.

As shown in FIG. 3, the touch display apparatus 2 according to the first embodiment of the present invention consists of a display unit 10 and a touch unit 20. Besides, the display unit 10 is installed above the touch unit 20 so as to prevent shadowing or reflections of external ambient light caused by the display unit 10, such that the display brightness of the touch display apparatus 2 will not be affected due to configuration of the touch input function.

The display unit 10 has a first substrate 11 paralleling a second substrate 12 and a display dielectric layer 13 sandwiched between the first substrate 11 and the second substrate 12 which are formed a display panel. The first substrate 11 and the second substrate 12 may be reelable, or allowed to bend up to a certain degree. The first substrate 11 is a transparent substrate and the second substrate 12 may be a transparent or a non-transparent substrate, while both of them may be made of materials like glass or plastic. In the present embodiment, the display dielectric layer 13 is composed of the E-ink or Sipix. The display unit 10 is a display panel of electronic paper technology. In other embodiments, the display unit 10 may be applied with other available display technologies such as Organic Light Emitting Display (OLED) display technology, Electro-wetting display technology, Liquid Crystal Display (LCD) display technology.

The touch unit 20 comprises a plurality of first electrodes 21, a plurality of second electrodes 22, a plurality of spacers 23, and a third substrate 24 paralleling second substrate 12. The plurality of first electrodes 21 is located on the lower surface of the second substrate 12 of the display unit 10 and the plurality of second electrodes 22 is located on the upper surface of the third substrate 24 having the plurality of first electrodes 21 and the plurality of second electrodes 22 facing each other. In addition, there is a gap with a plurality of insulate spacers 23 sandwiched between the second substrate 12 and the third substrate 24 for keeping a certain distance between the second substrate 12 and the third substrate 24.

A corresponding relation of position and quantity is between the plurality of first electrodes 21 and the plurality of second electrodes 22. For example, a one-to-one relation, indicates that each of the first electrodes 21 is respectively located over the corresponding second electrodes 22. A one-to-many relation indicates that each of the plurality of first electrodes 21 respectively faces to two or multiple corresponding the plurality of second electrodes 22.

Therefore, while an object, a user's finger or a stylus, touch the display unit 10, a local deformation is created on the display unit 10 due to a pressure generated by the touch. The first electrode 21 located on the lower surface of the display unit 10 corresponding to the touch point is allowed to touch a corresponding second electrode 22 located on the upper surface of the third substrate 24 and generate a current touch signal or a voltage touch signal. The touch controller 4 connected to the plurality of first electrodes 21 and the plurality of second electrodes 22 detects the touch signal generated by the touch with an object and determines the touch position of the touch object in order to control the playing of the electronic reading apparatus 3.

In the present embodiment, the display unit 10 is a display panel with the electronic paper technology. The third substrate 24 of the touch unit 20 located under the display unit 10 would be a transparent or non-transparent substrate and a rigid substrate or a reelable substrate, since the display unit 10 reflects ambient light to display the text and images. For instance, selecting substrates having lower manufacture cost such as plastic substrate or metal substrate, would not only avoid the brightness degrade of the touch display apparatus 2, but also reduce the manufacture cost of the touch display apparatus 2. In addition, the plurality of first electrodes 21 and the plurality of second electrodes 22 may be made of any kinds of metal conductive materials. However, selecting metal, carbon or other electrically conductive polymer electrodes instead of Indium Tin Oxide (ITO) electrodes would significantly reduce the manufacture cost of the touch display apparatus 2.

In addition, with the configuration of the spacer 23, a gap having a certain distance sandwiched between the display unit 10 and the third substrate 24 is able to avoid the unexpected touch signal. In particular, the elastic spacers 23 resume the gap sandwiched between the second substrate 12 and the third substrate 24 after users pressing down the surface of the display unit 10.

Figure 4:
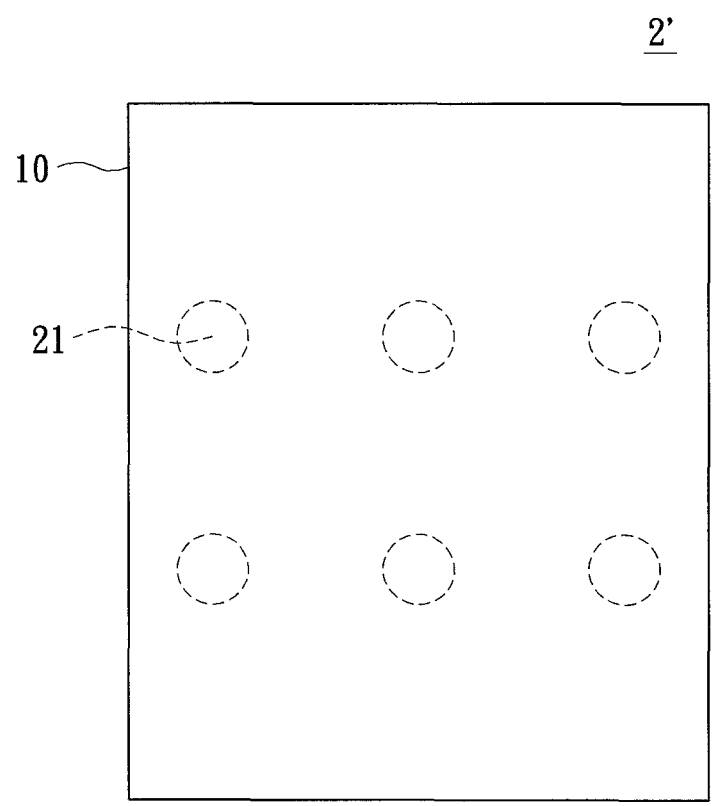
FIG. 4 shows a plan view of a touch display apparatus according to the first embodiment of the present invention.

FIG. 3 shows the structural cross-section view of the touch display apparatus 2. The plan view of the touch display apparatus 2 can refer to FIG. 4, for simplicity's sake, which only depicts the relative positions of the first electrodes 21 on the display unit 10. The relative positions of the first electrodes 21 on the display unit 10 would present different touch buttons for touch input with an object according to the different application operations.

Moreover, according to the descriptions illustrated hereinbefore, the cost of the integral touch unit 20 would be significantly reduced, since the quantity of the first electrodes 21 and the quantity of the second electrodes 22 installed in the touch unit 20 are based on the number of the plurality of fixed position of button icons required to be shown on the display unit 10. If the touch display apparatus 2 is employed in applications with high touch resolution, the electrode size of the first electrodes 21 and the second electrodes 22 may be scaled down and the configuration density may be increased, such that the operations of high touch resolution can be successfully performed.

Although the installation of the first electrodes 21 and the second electrodes 22 may not provide the touch resolution same as the Resistive Touch panel or the Capacitive Touch panel is capable of, placing the first electrodes 21 on the lower surface of the second substrate 12, choosing cheaper base substrates made of plastic or metal as the third substrate 24, and using metal electrodes made with lower manufacture cost materials as the first electrodes 21 and the second electrodes 22, would greatly reduce the manufacture cost of the base substrate of a general touch panel.

Figure 1:
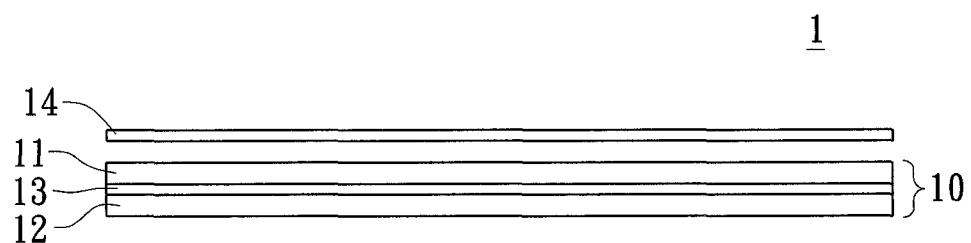
FIG. 1 shows a structural cross-section view of a conventional electronic reading apparatus with touch input function.

Therefore, the touch display apparatus 2 with touch input function would be made with extreme low manufacture cost and would avoid the brightness issue of the touch display apparatus caused by the touch unit 14 shown in FIG. 1.

Besides, even the touch unit 20 having smaller configuration density and fewer quantity of the first electrodes 21 and the second electrodes 22, determining and calculating with the touch unit 20 and the touch controller (not shown) would achieve the same result as gesture input can do.

Figure 5:
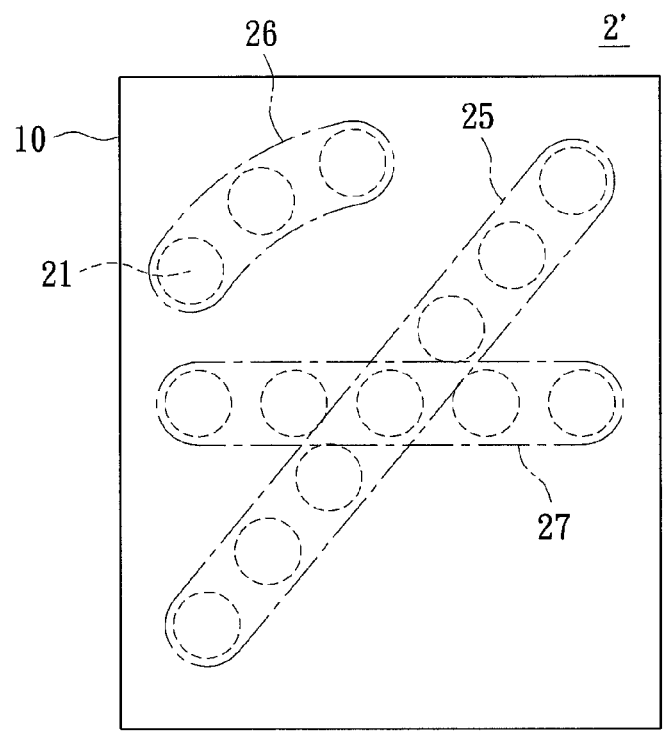
FIG. 5 shows a plan view of a touch display apparatus according to a second embodiment of the present invention.

FIG. 5 shows a plan view of a touch display apparatus regarding to a second embodiment of the present invention. The touch display apparatus 2' provides the gesture input function and the structural cross-section view thereof is identical to FIG. 3. The configuration density and distribution position of the first electrodes 21 in the touch display apparatus 2' differ from the counterparts found in FIG. 4. In FIG. 5, for simplicity's sake, only the relative position between the display unit 10 and the first electrodes 21 is depicted.

In FIG. 5, the distributions of the first electrodes 21 on the lower surface of the display unit 10 can be classified into three distribution areas which are a first distribution area 25, a second distribution area 26 and a third distribution area 27. Each distribution area comprises with a plurality of first electrodes 21. Moreover, the first electrodes herein are presented as three distribution areas, but it can also be one single distribution area, a combination of any two of three areas, or areas having other different profiles.

The first distribution area 25 is placed along the diagonal components of the display unit 10 such that the first electrodes 21 in the first distribution area 25 are closely arranged in a straight line, and the direction of such a straight line parallels the diagonal of the display unit 10.

The third distribution area 27 is placed along the horizontal components of the display unit 10 such that the first electrodes 21 in the third distribution area 27 are closely arranged in a straight line, and the direction of such a straight line is parallel to the horizontal direction of the display unit 10.

The second distribution area 26 is placed at the locations outside of the first distribution area 25 and the third distribution area 27. The first electrodes 21 in the second distribution area 26 are closely arranged in a semi-arc shape.

Accordingly, applying the touch display apparatus 2' to the electronic reading apparatus 3 depicted in FIG. 2 would enable electronic reading apparatus 3 to play the contents shown on the display unit 10 with various displaying operation under different applications. Examples will now be illustrated from FIG. 6A to 6C.

Figure 6A:
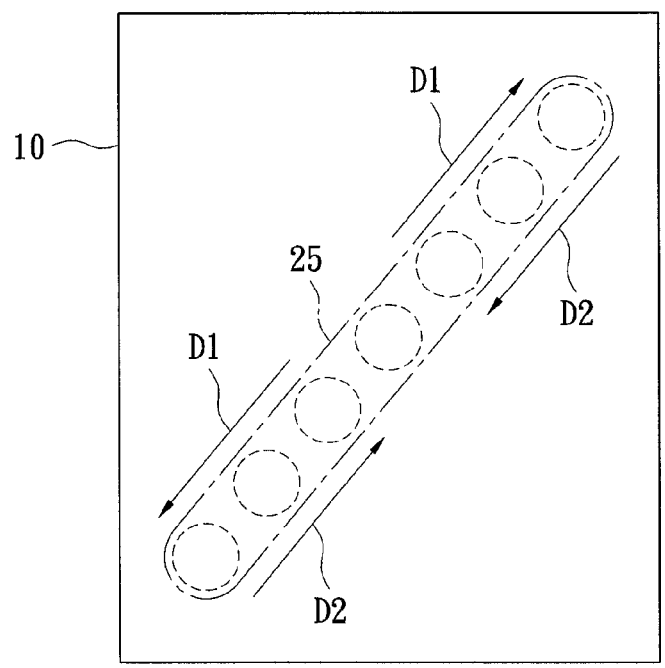
FIG. 6A~C are diagrams for touch operations on the touch display apparatus shown as FIG. 5.

As shown in FIG. 6A, users slide with two fingers on the surface of the display unit 10 corresponding to the first distribution area 25. If the direction of the movement in such a touch is from the center of the diagonal components in the display unit 10 toward the two endpoints of the diagonal in D1 direction, then the touch controller 4 receives a touch signal generated by the touch unit 20 based on the aforementioned touch. At this time, according to such a touch signal, the touch controller 4 generates a corresponding display instruction to the display unit 10 such that the display unit 10 zooms in (enlargement) the display contents shown thereon. Contrarily, if the direction of said touch is from the two endpoints of the diagonal in the display unit 10 toward the center of the diagonal in D2 direction, then the touch controller 4 generates a corresponding display instruction to the display unit 10 such that the display unit 10 zooms out (contraction) the display contents shown thereon.

Figure 6B:
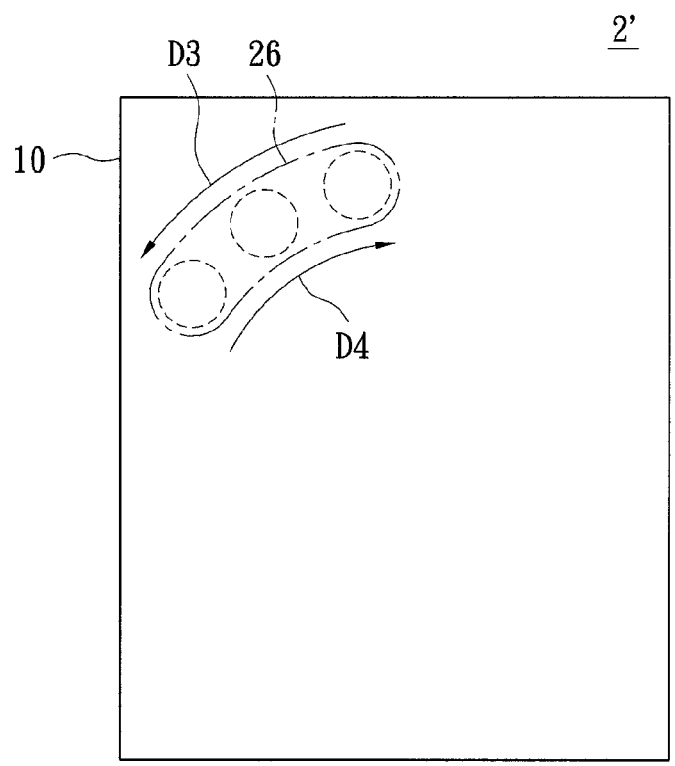

Next, as shown in FIG. 6B, users slide with one finger on the surface of the display unit 10 corresponding to the second distribution area 26. In case that the direction of such a touch moves in D3 direction, then the touch controller 4 receives a touch signal generated by the touch unit 20 based on the aforementioned touch. At this time, according to such a touch signal, the touch controller 4 generates a corresponding display instruction to the display unit 10 such that the display contents shown on the display unit 10 rotates counterclockwise at a preset angle. On the contrary, if the direction of such a touch moves in D4 direction, then the touch controller 4 generates a corresponding display instruction to the display unit 10 such that the display contents shown on the display unit 10 rotates clockwise at a preset angle.

Figure 6C:
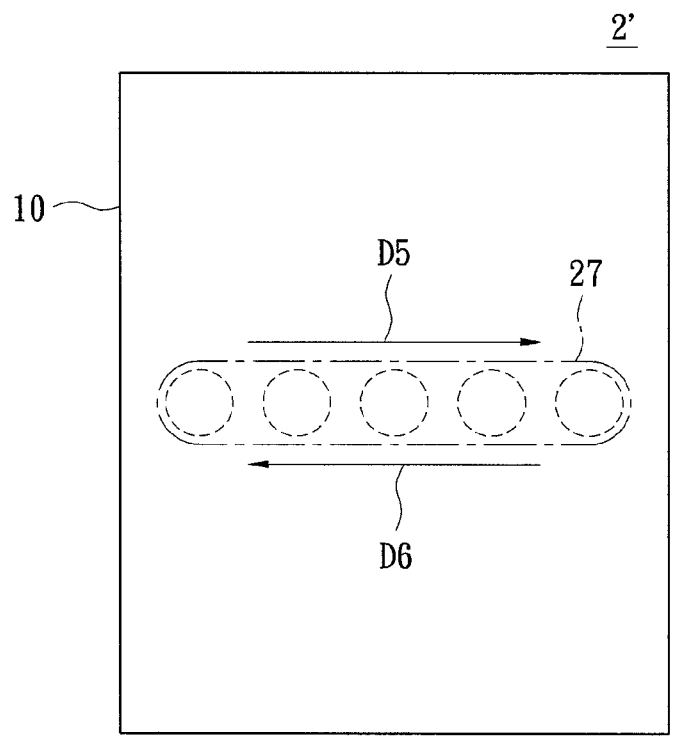

In FIG. 6C, the users slide with one finger on the surface of the display unit 10 corresponding to the third distribution area 27. If the direction of such a touch moves in a horizontal direction of the display unit 10 toward D5 direction, then the touch controller 4 receives a touch signal generated by the touch unit 20 based on the aforementioned touch. At this time, according to such a touch signal, the touch controller 4 generates a corresponding display instruction to the display unit 10 such that the display contents shown on the display unit 10 turns to next page. On the other hand, if the direction of such a touch moves in a horizontal direction of the display unit 10 toward D6 direction, then the touch controller 4 generates a corresponding display instruction to the display unit 10 such that the display contents shown on the display unit 10 turns to previous page.

Furthermore, according to the aforementioned descriptions, the touch display apparatus 2, 2' shown in FIG. 2 is exemplary illustrated with reference to application in the electronic reading apparatus; but the disclosed touch display apparatus 2, 2' may be also applied to other electronic devices, such as laptops, PDA, POS, cellular phones, digital cameras and the like. The present invention is by no means limited to the applications of the touch display apparatus 2, 2' in the electronic reading apparatus.

In other embodiments, the plurality of first electrodes 21 can reshape into an elongated bar form, or alternatively to reshape the plurality of second electrodes 22 into an elongated bar form.

Therefore, according to the embodiment of the present invention, in the touch display apparatus 2, 2', the touch unit 20 is installed under the display unit 10, and the display unit 10 is a reelable display panel or a display panel allowable for bending to a certain degree. In addition, the touch unit 20 can use the plurality of first electrodes 21 installed on the lower surface of the display unit 10 and the plurality of second electrodes 22 installed on the upper surface of the third substrate 24 to provide the touch input function. Thereby, when the user touches the display unit 10 of the touch display apparatus 2, 2', a local deformation can be created on the display unit 10, such that the first electrodes 21 and the second electrodes 22 are brought in contact and a touch signal is accordingly generated.

As such, in addition to the touch input function, according to the embodiment of the present invention, the touch display apparatus 2, 2' may also prevent the display brightness degrade in the display unit 10 caused by the touch unit 20. Thus, according to the present invention, the touch display apparatus 2, 2' enables the electronic reading apparatus to have both the touch input function and good display brightness, and the manufacture cost can be effectively reduced, thereby improving the industrial usage thereof.

It should be noted that, however, the aforementioned texts illustrate merely the detailed descriptions and appended drawings of the present invention, rather than being intended to restrict the scope of the present invention thereto. The scope of the present invention should be based on the following claims, and all changes, alternations or substitutions conveniently considered by those skilled ones in the art in the field of the present invention should be deemed as being encompassed by the scope of the present invention delineated in the claims as below.

What is claimed is:

1. A touch display apparatus, comprising:
   a display unit, which has a first substrate paralleling a second substrate, and a display dielectric layer sandwiched between the first substrate and the second substrate; and
   a touch unit, which is installed under the display unit and consists of:
      a third substrate, installed under the second substrate in parallel, with a gap of fixed distance retained relatively to the second substrate;
      a plurality of first electrodes, installed on the lower surface of the second substrate; and
      a plurality of second electrodes, installed on the upper surface of the third substrate and facing toward such a plurality of first electrodes, wherein the second substrate has at least one linear distribution area, the first electrodes are distributed in the at least one linear distribution area, and no other touch sensing electrodes are disposed on the second substrate besides the first electrodes in the at least one linear distribution area.

2. The touch display apparatus according to claim 1, wherein the first substrate is a transparent substrate, and the first substrate and the second substrate are one of a reelable substrate or a substrate allowable for bending to a certain degree.

3. The touch display apparatus according to claim 1, wherein the third substrate is a transparent or a non-transparent substrate, and the third substrate is one of a rigid or a reelable substrate.

4. The touch display apparatus according to claim 1, wherein the plurality of first electrodes and the plurality of second electrodes are made of one of the metal, carbon or other electrically conducting polymer.

5. The touch display apparatus according to claim 1, further comprising a display dielectric layer sandwiched between the first substrate and the second substrate, and the display dielectric layer is the E-Ink or an electro-wetting layer.

6. An electronic reading apparatus, comprising:
   a display unit, which has a first substrate paralleling a second substrate, as well as a display dielectric layer sandwiched between the first substrate and the second substrate;
   a touch unit, which is installed under the display unit, and generates a touch signal as the display unit being touched with a slide by a touch object, consisting of:
      a third substrate, installed under the second substrate in parallel, with a gap of fixed distance retained relatively to the second substrate;
      a plurality of first electrodes, installed on the lower surface of the second substrate; and
      a plurality of second electrodes, installed on the upper surface of the third substrate and facing toward such a plurality of first electrodes, thereby generating a touch signal by the contact occurring between the first electrode and the corresponding second electrode as the touch unit being touched, wherein the second substrate has at least one linear distribution area, the first electrodes are distributed in the at least one linear distribution area, and no other touch sensing electrodes are disposed on the second substrate besides the first electrodes in the at least one linear distribution area; and
   a touch controller, which receives the touch signal, and controls the display operation for the display contents of the display unit in accordance with a display instruction corresponding to the received touch signal.

7. The electronic reading apparatus according to claim 6, wherein the display instruction is an instruction of zoom-out, zoom-in, rotate or turn-page to be performed on the display contents.

8. The electronic reading apparatus according to claim 6, wherein the touch controller performs the zoom-out or zoom-in display instruction on the display contents when the slide direction of the touch object is parallel to the direction of the diagonal direction in the display unit.

9. The electronic reading apparatus according to claim 6, wherein the touch controller performs the rotate display instruction on the display contents when the slide direction of the touch object is semi-arc shape.

10. The electronic reading apparatus according to claim 6, wherein the touch controller performs the turn-page display instruction on the display contents when the slide direction of the touch object is the horizontal direction of the display unit.

* * * * *